US007050122B2

(12) United States Patent
Gibbon et al.

(10) Patent No.: US 7,050,122 B2
(45) Date of Patent: May 23, 2006

(54) EQUIPMENT AND TECHNIQUES FOR INCREASING THE DYNAMIC RANGE OF A PROJECTION SYSTEM

(75) Inventors: Michael A. Gibbon, Oakville (CA); Samuel Z. Zhou, North York (CA); Sean Adkins, Vancouver (CA); Sergei G. Anikitchev, Tuscon, AZ (US); Graham H. Moss, Oldham (GB); Brian Eckersley, Manchester (GB)

(73) Assignee: Imax Corporation (CA)

( * ) Notice: Subject to any disclaimer, the term of this patent is extended or adjusted under 35 U.S.C. 154(b) by 627 days.

(21) Appl. No.: 10/312,070

(22) PCT Filed: Jul. 3, 2001

(86) PCT No.: PCT/US01/21367

§ 371 (c)(1),
(2), (4) Date: Dec. 19, 2002

(87) PCT Pub. No.: WO02/03687

PCT Pub. Date: Jan. 10, 2002

(65) Prior Publication Data

US 2004/0001184 A1 Jan. 1, 2004

Related U.S. Application Data

(60) Provisional application No. 60/215,706, filed on Jul. 3, 2000.

(51) Int. Cl.
*H04N 5/74* (2006.01)
*H04N 5/52* (2006.01)

(52) U.S. Cl. ...................... 348/771; 348/678

(58) Field of Classification Search ............... 348/771, 348/678, 671, 673, 674, 687, 742, 743; 349/61; H04N 5/74, 5/52
See application file for complete search history.

(56) References Cited

U.S. PATENT DOCUMENTS

| | | | |
|---|---|---|---|
| 5,386,253 A | | 1/1995 | Fielding |
| 5,490,009 A | | 2/1996 | Venkateswar et al. |
| 5,589,852 A | | 12/1996 | Thompson et al. |
| 5,592,239 A | | 1/1997 | Hara et al. |
| 5,612,753 A | | 3/1997 | Poradish et al. |
| 5,673,060 A | | 9/1997 | Blaxtan et al. |
| 5,680,180 A | * | 10/1997 | Huang ................... 348/656 |
| 5,686,939 A | | 11/1997 | Millward et al. |
| 5,699,130 A | | 12/1997 | Taylor |
| 5,757,348 A | | 5/1998 | Handschy et al. |
| 5,986,640 A | | 11/1999 | Baldwin et al. |
| 6,034,660 A | | 3/2000 | Millward et al. |

(Continued)

FOREIGN PATENT DOCUMENTS

EP 0 755 556 5/2000

(Continued)

OTHER PUBLICATIONS

Patent Abstracts of Japan, vol. 017, No. 387 (P-1576), Jul. 20, 1993 & JP 05 066501 A (Toshiba Corp), Mar. 19, 1993.

*Primary Examiner*—Michael H. Lee
(74) *Attorney, Agent, or Firm*—Dean W. Russell; Michael J. Turton; Kilpatrick Stockton LLP

(57) ABSTRACT

Apparatus and techniques for enhancing the dynamic range of electronic projection systems are detailed. Included among the techniques are pre-modulation, luminance compensation, and partial luminance compensation.

28 Claims, 11 Drawing Sheets

U.S. PATENT DOCUMENTS

| | | |
|---|---|---|
| 6,057,816 A | 5/2000 | Eckersley |
| 6,064,366 A | 5/2000 | Millward et al. |
| 6,285,349 B1 | 9/2001 | Smith |
| 6,310,591 B1 * | 10/2001 | Morgan et al. ............... 345/84 |
| 6,317,112 B1 | 11/2001 | Handschy et al. |
| 6,348,907 B1 | 2/2002 | Wood |
| 6,392,717 B1 * | 5/2002 | Kunzman ................... 348/744 |
| 6,535,187 B1 * | 3/2003 | Wood ........................... 345/84 |
| 6,891,524 B1 * | 5/2005 | Sakashita ..................... 345/89 |

FOREIGN PATENT DOCUMENTS

| | | |
|---|---|---|
| JP | H6-102484 | 4/1994 |
| WO | WO 94/10675 | 5/1994 |
| WO | WO 99/60557 | 11/1999 |

* cited by examiner

Where $(N-1) \leq \alpha \leq M$

EQUIPMENT AND TECHNIQUES FOR INCREASING THE DYNAMIC RANGE OF A PROJECTION SYSTEM

CROSS-REFERENCE TO RELATED APPLICATIONS

This application claims priority to U.S. Provisional Application Ser. No. 60/215,706 filed on Jul. 3, 2000 and U.K. Application Serial No. 00163402 filed on Jul. 3, 2000 and International Application No. PCT/US01/23167 filed on Jul. 3, 2001 and published in English as International Publication No. WO 02/03687 A2 on Jan. 10, 2002, the entire contents of which are incorporated herein by this reference.

FIELD OF THE INVENTION

This invention relates generally to projection of images and more specifically to techniques and equipment for enhancing the dynamic range of images projected electronically through, typically, digital projectors.

BACKGROUND OF THE INVENTION

U.S. Pat. No. 5,386,253 to Fielding, incorporated herein in its entirety by this reference, discusses exemplary projection systems utilizing one or more spatial light modulators (SLMs). As noted in the Fielding patent:

Spatial light modulator devices include so-called "active matrix" devices, comprising an array of light modulating elements, or "light valves," each of which is controllable by a control signal (usually an electrical signal) to controllably reflect or transmit light in accordance with the control signal. A liquid crystal array is one example of an active matrix device; another example is the deformable mirror device (DMD) developed by Texas Instruments . . .

See Fielding, col. I, II. 13–21. Of course, yet other types of light "engines," or sources, exist, and various of them may be used in connection with the inventions described herein.

Regardless of the type of light sources and modulators used, audiences frequently desire to see images high in detail and richness and low in objectionable artifacts. High resolution and image quality in particular facilitates suspension of disbelief of an audience as to the reality of the projected images. Such quality indeed often is an important factor in the overall success of the motion picture viewing experience among today's audiences.

Producing these high-resolution images is not without added cost, however. Imax Corporation, for example, the intended assignee of this application, utilizes not only specialized cameras and projectors, but also seventy millimeter, fifteen perforation film to increase the resolution and quality of projected images. Conventional electronic projectors (and especially those utilizing SLMs), by contrast, generally cannot supply equivalent resolution in projected images. As well, such electronic projectors frequently fail to furnish the dynamic range and overall brightness of images provided by large-format films. They nonetheless may desirably (or necessarily) be employed to display non-film-based images such as (but not limited to) computer-generated graphics or material captured with electronic cameras.

A DMD is a type of SLM that consists of a two dimensional array of mirrors. The mirror array is imaged through a projection lens onto a screen so that each mirror functions as an image pixel. Each mirror can be electronically controlled to assume two positions, one that reflects incident light towards the projection lens, this is the "on" state, and another position that does not reflect incident light towards the projection lens but directs it instead to for example a beam dump, this is the "off" state.

The DMD is therefore a binary light modulator. Variable intensity may be produced by controlling the time that a mirror spends in each state, on or off, and repeatedly cycling each mirror between the on and off states in a regular pattern according to a series of image frames as is conventional in the display of moving images. By varying the amount of time each mirror spends in the on state during each frame time the brightness of each pixel can be controlled. This technique is called pulse width modulation or PWM.

Using PWM a grayscale can be created with a DMD device. This grayscale can be controlled by input digital data in the form of a binary code. For example, dividing each frame time into ten time periods of different lengths can create a 10 bit gray scale. The length of the time period corresponding to the least significant bit (LSB) in the address signal for any particular frame is set at a predetermined value, the duration of the time period corresponding to the next significant bit (LSB+1) being twice as long as that corresponding to the LSB and so on. Thus, the length of the time period corresponding to the most significant bit (MSB) for a 10 bit input signal is 512 times that corresponding to the LSB. This gives a total of 1024 possible gray scale values between full black (the DMD mirror remains in the off state for the fill frame time) to full white (the DMD mirror remains in the on state for the full frame time). Provided that the lowest PWM frequency for the MSB is above the "fusion frequency" for the human visual system, each of the PWM cycles will be integrated and provide the sensation of a continuously variable grayscale corresponding to the binary value of the input signal. This technique is called binary PWM.

Using binary PWM the output brightness level from each mirror is in proportion to the fraction of time that the mirror is "on" within a frame interval. As a result, the output brightness level B from a single DMD pixel can be modeled by the following equation:

$$B = (\alpha y + \delta) TL = \alpha y TL + \delta TL. \quad (1)$$

In equation (I), L is the incident light intensity from a light source, y is the digital signal with normalized values ranging from 0 to 1 and T is the time duration of each display frame. The factor $\alpha < 1$ represents the optical efficiency of a DMD pixel. The maximum output or "white level" from a DMD device is obtained when signal value reaches its maximum or y=1, i.e.:

$$B_w = B_{y=1} = (\alpha + \delta) TL. \quad (2)$$

Similarly, the minimum output or "dark level" of the DMD device is reached when y=0, i.e.:

$$B_b = B_{y=0} = \delta TL. \quad (3)$$

The ratio of maximum to minimum level determines the contrast ratio of a DMD-based projector. The minimum level is the result of unwanted light being reflected into the projection lens pupil when the mirror is in the off state. This is caused by several factors including scattering from the mirror edges and the structure beneath the mirrors. The sources of unwanted off state light are combined into the term δ in Equation (1). For a DMD device that truly supports an n-bit dynamic range, its dark level must be less than the brightness level represented by the least significant bit (LSB) of the digital input signal. In other words, the following relationship must be maintained:

$$\delta < \frac{1}{2^n - 1}. \qquad (4)$$

The dark level or the lowest light level that can be displayed sets a limit to the amount of detail that can be generated in dark scenes. In the case of a DMD projector system, the switching speed of the DMD device determines the minimum bit time (LSB). In addition, the dark level represents the minimum displayable level when the DMD is in the fully off state. Reducing the LSB display brightness below some critical value produces little gain in apparent gray scale bit depth since the increase in grayscale resolution is masked by the DMD dark level. The dark level also limits the contrast ratio that the system can display. For typical SLM based projection systems this is between 200:1 and 500:1 depending on the optical design.

In order for a viewer to perceive images that have a full range of tones, allowing the richest imagery that is as close to reality as possible it is necessary to provide varying levels of projection system contrast depending on the light levels that are provided by the system and also depending on the ambient light levels of the surrounding viewing environment. The human visual system has a "simultaneous contrast range" which refers to the contrast range that a typical human observer can see at one time in a given state of adaptation to overall scene brightness. This is normally accepted to be in the range of 200:1. However, the human visual system adapts its simultaneous contrast range to a much wider range of total scene brightnesses, amounting to about seven decades from the darkest part of the scene to the brightest. It is common for an observer to change adaptation over a significant portion of this range as the observer's point of regard in the scene changes. This is exemplified by looking at the exterior of a building in bright sunlight, and then looking into the underground parking lot. A typical viewer can see both cars in the parking lot and features on the bright building even though the total contrast range in this scene exceeds the simultaneous contrast range that the viewer can perceive.

The projection system contrast that is required to produce a sensation equivalent to a full range of tones increases as the projection light levels decrease, and also increases as the surround becomes darker. In a typical motion picture theatre viewing environment a projection contrast of 1000:1 or higher is needed in order for the viewer to perceive a full range of tones equivalent to the viewer's simultaneous contrast range of 200:1. In addition, the size of the steps in grayscale that are required for a difference to be perceived varies with brightness. An observer can discriminate between much smaller steps in grayscale at lower levels of brightness than he/she can at a higher brightness level.

When representing grayscales using binary data it is common to refer to the number of bits in the binary numbers used as the "bit depth." A greater number of bits obviously produce finer steps in the gray scale, and up b some threshold, determined in part by the viewing conditions, a larger number of gray scale steps, and therefore a larger number of bits are desirable. However, as discussed above, there is no value in subdividing the grayscale steps below the smallest step that is just perceivable above the dark level of the projection system.

In International Patent Application WO 94/10675 (incorporated herein in its entirety by reference), there is described a method of increasing the bit depth of a DMD based display system in which the intensity of the light source used to illuminate the DMD is modulated on a binary basis. However, while extending the normal gray scale bit depth (since this binary modulation takes place within a single video frame) it has no effect on the DMD black level. Also with such lamp modulation, the power supply has to change output very rapidly and thus imposes demanding design requirements on the lamp power supply and may also generate a significant amount of electromagnetic interference.

The dark level can be reduced as improvements are made to the architectural design of DMDs and other light modulating devices, but it may not be completely eliminated. Therefore, equipment and techniques for decreasing the dark level and thus, increasing the dynamic range of a SLM projector are desirable.

SUMMARY OF THE INVENTION

The present invention seeks to provide such advancements by addressing deficiencies of, typically (but not necessarily exclusively) electronic, SLM-employing projectors. It further does so in a more comprehensive manner than heretofore considered, attempting to create equipment and techniques capable of providing images of sufficient overall quality that they may be used in venues instead of, or in addition to, traditional large-format film projectors without disturbing audience perception that the viewed images are of high quality. As noted above, this perception is a significant aspect of modern-day viewing experiences, at times helping determine overall success among the public of particular motion pictures.

Selected embodiments of the invention may use additional SLMs as pre-modulators to improve the dynamic range of the system. Some preferred embodiments of the invention employ a global or "single-pixel" pre-modulator (typically an SLM) adapted to improve the dynamic range of the entire downstream SLM. In operation, the pre-modulator functions to block light from the downstream SLM to darken its entire image and enhance the black levels of selected scenes. The downstream SLM would retain its full dynamic range capability, but would have as its input new illumination levels when appropriate or desired. For scenes that are bright, the pre-modulator need not be activated; in which event normal brightness levels would be maintained. The pre-modulator thus may be used to adapt the projector to scene brightnesses, matching generally how the human visual system functions. In another embodiment, two or more SLMs are arranged so that there exists a precise one-to-one correspondence of their pixels. In yet other embodiments, a separate pre-modulator could be used to darken a selected area (e.g. a quadrant), so that precise one-to-one correspondence of pixels is not required between a particular pre-modulator and the downstream SLM. In any event, each SLM could be driven independently but in concert so that their dynamic range capabilities would combine to extend the resulting dynamic range.

Yet additional features of the present invention include luminance compensation for selectively increasing the illumination levels provided by the downstream SLMs when, for example, further overall scene contrast is desired. Compensation algorithms may particularly be useful when single-pixel pre-modulators are used, as the global pre-modulation they provide may occasionally diminish too much the input to the downstream SLMs. Additional features of the present invention include partial luminance compensation in order to avoid highlight clipping on luminance and color components.

Additional features of the present invention relate to the method of providing a control signal to the pre-modulator in concert with the image data supplied to the SLM.

Other features and advantages of the present invention will be apparent to those skilled in the relevant art with reference to the remainder of the text and drawings of this application.

DETAILED DESCRIPTION OF THE DRAWINGS

Figure 1:
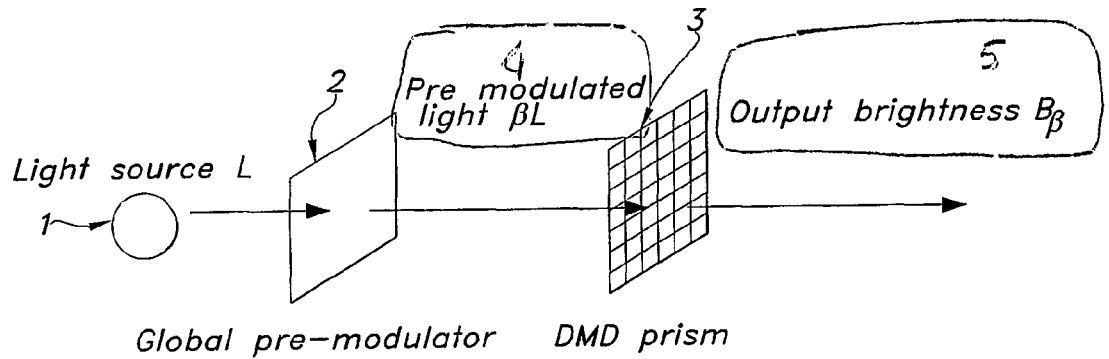
FIG. 1 is a schematized diagram of an embodiment of the system of the present invention.

FIG. 1 illustrates a schematized diagram of an embodiment of the system of the present invention. As shown in FIG. 1, a light source 1 such as a lamp directs a light beam on a pre-modulator 2. The pre-modulator 2 shown in FIG. 1 is a single pixel or global pre-modulator such as a variable reflectance mirror or a variable transmittance neutral density filter. A multi-pixel addressable SLM device could also be used. While FIG. 1 shows a DMD, other spatial light modulator devices known in the art could be used.

The pre-modulator 2 controls the amount of light incident on DMD device 3. When the pre-modulator reduces the light incident on the DMD the dark level of the DMD will be reduced. The pre-modulator acts to vary the intensity of the light incident on the DMD in a discrete or continuous fashion according to the method used to implement it.

The action of the pre-modulator can be modeled by a variable $\beta(\beta \leq 1)$, called the pre-modulation factor. When $\beta$ is less than 1 the incident light onto the DMD is reduced.

The output brightness from a DMD device with a global premodulator can simply be represented by $$B_\beta = \beta B. \quad (5)$$

The application of a global pre-modulator does not change the contrast ratio of a SLM projector at any given instance, since both white and dark levels are reduced by the same factor $\beta$, $$B_{\beta,w} = \beta B_w,$$

and $$B_{\beta,b} = \beta B_b. \quad (6)$$

However, since the global pre-modulator changes the full-scale value expressed by the dynamic range of the SLM, it effectively changes the size of the steps between successive grayscale levels displayed by the SLM. The human visual system varies in sensitivity to grayscale step changes as the overall scene brightness changes, so a system that can vary the size of the displayed grayscale steps with scene content results in higher perceived image quality.

Additionally, the pre-modulator does increase the dynamic range of the system, or its total contrast range, since at the maximum attenuation setting the pre-modulator reduces the black level, while at the minimum attenuation setting essentially the full white level of the projector is maintained.

In a motion picture film it is common for some scenes to contain predominantly bright tones, and for some scenes to contain predominantly dark tones. It is these darker scenes where the increased black level of a conventional SLM projector is most objectionable. In addition, the perceived brightness or darkness of a new scene is affected at a scene transition by the viewer's state of adaptation. Since motion pictures are viewed as a continuous series of changing scenes, the ability of the projector to adapt to scene brightness operates as a compliment to the viewer's state of adaptation and creates the sensation of an increased contrast range.

Therefore, by controlling the amount of pre-modulation, a SLM projector can adapt to scene brightness so that the range of brightness delivered is optimized for human perception. This technology is called "adaptive dynamic range window"(ADRAW) projection. As previously discussed, our perception of contrast works like a window sliding within a much larger adaptation range, and the location of that "contrast range window" is determined by specific viewing conditions.

The existence of a sliding contrast range window within our visual system suggests that the most efficient projection system would be the one that is adaptive to scene brightness and viewing conditions. For cinematic applications, the viewing condition is well controlled, and viewers adapt only to changes in scene brightness. Since viewers only perceive a limited range of brightness levels within a certain contrast range window, it is sufficient for a projector to provide a contrast range that matches this window while moving the window upward and downward with each change of scene brightness.

Figure 2:
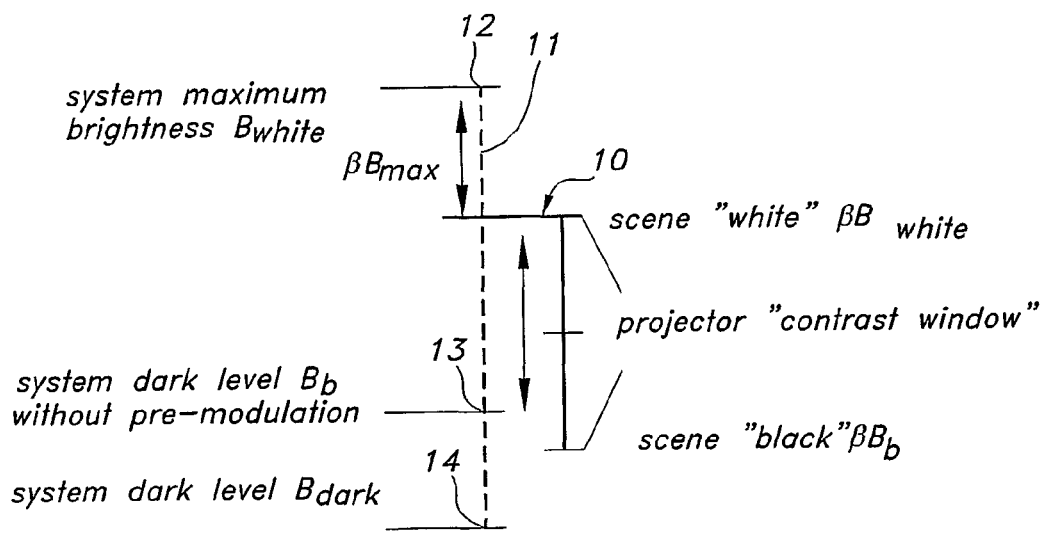
FIG. 2 illustrates the concept of an adaptive dynamic range window.

FIG. 2 illustrates the concept of the adaptive dynamic range window (ADRAW) projector. As shown in FIG. 2, the dynamic range window 10 moves up and down the brightness range scale 11 shown as a dotted line.

The global pre-modulator 2 as described with respect to FIG. 1 provides a simple method of implementing the ADRAW concept for a SLM projector. If a scene is bright, the pre-modulator is at the minimum attenuation setting ($\beta=1$), and the projection system outputs maximum brightness. In that case, the dynamic range window 10 of the system is positioned at the top 12 of the scale 11. When a scene is dark, the pre-modulator attenuates the light ($\beta<1$), and the output brightness is reduced, and so is the dark level. When the pre-modulator is at the maximum attenuation setting, the dynamic range window 10 moves down the scale 11 to the bottom 14. Without pre-modulation, the dynamic range window 10 extends only to position 13 on the scale 11. As a result, an ADRAW projector system is capable of supporting a much larger dynamic range than the contrast range of a conventional SLM projector.

The current window 10 position is controlled by pre-modulation factor $\beta$. The value of $\beta$ is selected based on scene brightness, and it can vary in a continuous range or in discrete steps. The value of $\beta$ may be determined by various techniques such as a thresholding of pixel values in the image, averaging of pixel values in the image or other techniques that relate to the brightness of the image as perceived by the viewer.

FIG. 2 shows the expanded dynamic range from an adaptive projector with global pre-modulation. Assuming the pre-modulation factor varies within the following range:

$$\beta_{min} \leq \beta \leq \beta_{max}. \quad (7)$$

Compared with a DMD system without pre-modulation, the system "white" level is:

$$B_{\beta,w} = \beta_{max} B_w \quad (8)$$

and remains unchanged if $\beta_{max}=1$, but the system dark level is reduced:

$$B_{\beta,b} = \beta_{min} B_b \quad (9)$$

The actual "white" and "black" levels delivered by the projector are determined by the amount of pre-modulation, and they can be calculated from equation (6).

Data Formatting

The image data that represents the motion picture is supplemented with data that represents the pre-modulation factor $\beta$ and as will be shown possibly other compensation information as well. All of this data may be incorporated in a data stream supplied to the projector. For example, if the high definition video standard SMPTE 274M is used, the information needed to control the pre-modulator may be formatted into the blanking interval of this signal. Alternatively, the serial digital video standard SMPTE 292 may be used and the information encoded into "metadata" in the serial digital video signal according to extensions to the SMPTE 292 standard currently under consideration. It is also possible to use the "alpha" channel to carry the pre-modulation factor when using image formats which support it such as the dual link 4:4:4:4 mode of SMPTE 292.

While it is preferable for each scene to be viewed under representative conditions with a pre-modulator equipped projector so that the pre-modulation factor and other compensation information can be determined interactively by a skilled operator, it is also possible for an automatic selection of the pre-modulation factor and other compensation to be made by circuitry in the projector. This circuitry would consider scene brightness and according to pre-determined rules select the appropriate pre-modulation factor. Other hardware between the input data and the SLM would modify the pixel values as required to implement any additional compensation as described next.

Luminance Compensation

Simply sliding a dynamic range window up and down the brightness scale does not always deliver the best visual results. For example, in a test, global pro modulation was applied to a relatively dark scene and the pre-modulation factor $\beta$ was set to 0.5. Although image brightness was reduced by 50%, the contrast ratio should have remained unchanged because the dark level was also reduced by the same factor. However, as can be predicted from data on the human visual system there was a loss of apparent contrast due to the reduced overall brightness of the image. Furthermore, colors appeared less saturated when total scene brightness was reduced.

To improve perceived image quality, the apparent loss of contrast can be compensated through a luminance compensation algorithm. Tile purpose of the algorithm is to modify the pixel code values so that the overall apparent image contrast is retained.

Figure 3:
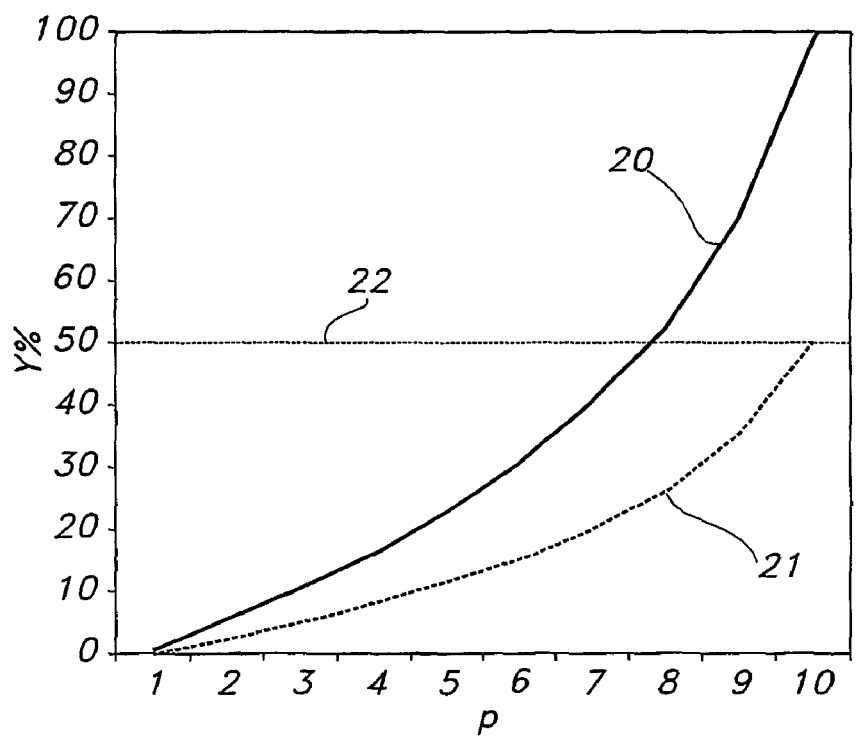
FIG. 3 illustrates an example of the luminance compensation algorithm.

FIG. 3 illustrates the effect of pre-modulation on the gray scale transfer function of the projector. The relationship between the luminance Y and the pixel code values p for a projector before modulation 20 and after modulation 21 is shown. Assuming Y is some function of p (the characteristic curve of the projector), the relationship between luminance Y and pixel code p, is shown by:

$$Y=f(p) \quad (10)$$

then pre-modulation reduces the output luminance by:

$$Y=f_\beta(p)=\beta f(p). \quad (11)$$

In FIG. 3 dotted line 22 shows the maximum luminance Y=50% that is the maximum white level determined by $\beta=0.5$. As this figure shows, brightness is reduced. Luminance compensation is introduced to increase the contrast by multiplying each pixel code by a compensation factor c, so that:

$$f_\beta(cp)=f(p). \quad (12)$$

The amount of compensation c for each pixel code can be calculated from equation (12), which results in:

$$c = \frac{f_\beta^{-1}(f(p))}{p} = \frac{1}{p} f^{-1}\left(\frac{f(p)}{\beta}\right). \quad (13)$$

Figure 4:
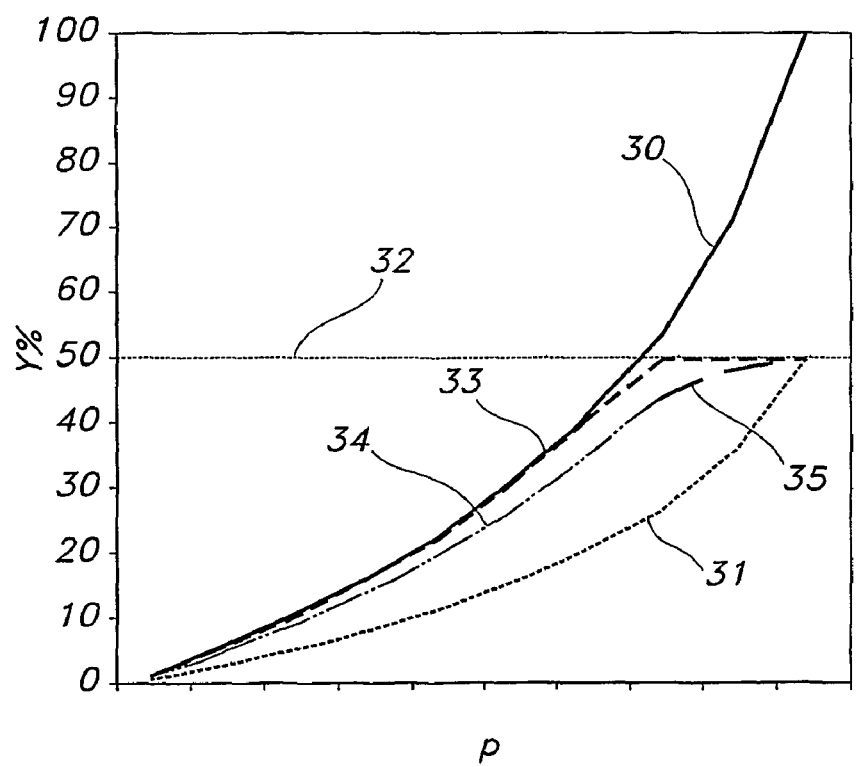
FIG. 4 illustrates an example of partial luminance compensation to avoid highlight clipping.

FIG. 4 shows how luminance compensation operates. Here the projector transfer function without pre-modulation 30 is shown along with the pre-modulated function 31. The fully compensated transfer function 33 has the same slope in the mid-tone and highlight areas until the maximum value of Y=50% is reached.

Highlight Clipping and Partial Compensation

The luminance compensation algorithm improves visual quality, but it may also introduce highlight clipping. Highlight clipping occurs when the compensated code value required for full compensation exceeds the maximal value of an n-bit pixel code p, $$cp = f^{-1}\left(\frac{f(p)}{\beta}\right) > 2^n - 1 \quad (14)$$

In other words, the compensation code c cannot bring the pixel code p to the appropriate level. Highlight clipping can be seen in FIG. 4 where the compensated transfer function 33 is clipped where it exceeds the maximum brightness possible as defined by line 32 which is determined by the pre-modulation factor β=0.5. For all pixel values p greater than the pixel values corresponding to the point of intersection of the compensated transfer function 33 with line 32, clipping will occur since all of these greater pixel values will result in the same luminance value Y=50%.

Clipping in image highlights removes details in highlight regions and introduces visible degradation to the image. It is common to balance the white point of a RGB color SLM based display by adjusting the gains of the three color channels. A color shift in the highlight areas may occur if clipping occurs on only one or two color channels because of the different gains in the three channels. For instance, a blue sky may appear yellowish after clipping, since the saturated blue channel will be the one most affected by clipping.

Highlight clipping can be avoided if the amount of pre-modulation is selected so that it covers the entire luminance range of the original image:

$$f_\beta(2^n-1) \leq f(p_{max}) \tag{15}$$

where $p_{max}$ is the maximum pixel value in the original image data. However, the amount of pre-modulation that satisfies condition (15) may not provide the desired black level for a given scene. In addition, simpler pre-modulation schemes may only allow certain discrete values for β. There will always be a trade-off between enhanced black level and highlight clipping.

For images where the desired black level is not obtained when equation (15) is satisfied, partial compensation can be applied to reduce highlight clipping. Partial compensation is the result of relaxing the full compensation condition (12) to be $$f_\beta(cp) < f(p). \tag{16}$$

In FIG. 4, when pre-modulation factor β=0.5 is used to obtain transfer function 31, highlight clipping occurs when full compensation is used as shown by transfer function 33. Partial compensation (c'<c) may be applied as shown in transfer function 34, where the luminance Y after compensation will be $f_{\beta_1}(c' p)$ which is not clipped. It is also desirable to apply a shoulder or "soft clip" such as shown at 35 to compensated transfer functions where clipping occurs so that the compression of the highlights is more gradual.

It is possible to employ a variety of compensation schemes to the image data, and to set the points at which full or partial compensation is effective depending on the scene content. This is best accomplished by viewing the scene and setting the compensation and pre-modulation values. Compensated pixel values for each frame in each scene are then obtained by image processing. A hardware look-up table may also be employed to supply the compensated pixel data. In this case the look-up table is addressed by the input data and the look-up table entries are modified by the pre-modulation settings and the compensation factor so that the look-up table outputs are the compensated pixel values required for each pre-modulator setting.

It is also essential that the projector characteristic curve be known. This is best obtained through measurement under actual projection conditions. Such a measurement will map input pixel values to output brightnesses while taking into account all of the non-linearities in the system due to image data formats and transfer functions that may be inherent in the data such as gamma correction in video images or the gamma of images scanned from film.

In one embodiment, the luminance off the screen is measured using a Minolta CS-100 chroma meter. The measurement is taken at the same position near the center of the screen. A 17-step full frame grayscale wedge is used for the entire data range and a 32-step grayscale wedge is used for the lower luminance values. Each grayscale wedge is projected onto a high-gain screen and the corresponding CIE Y component measured from a fixed position near the center of the screen. The data is then fit with a piece-wise curve:

$$Y = f(p) = \begin{cases} \left(\frac{p}{2^n-1}\right)^{\gamma 2}(Y_{hmax} - Y_{hmin}) + Y_{hmin}, & 64 \leq p \leq 255 \\ \left(\frac{p}{2^n-1}\right)^{\gamma 1}(Y_{lmax} - Y_{lmin}) + Y_{lmin}, & 0 \leq p < 64 \end{cases} \tag{17}$$

The gamma values γ1 and γ2 for both the top part and lower part of the curve are determined by curve fitting.

While this embodiment is described with a light source used to illuminate a single DMD, it will be appreciated that usually several DMDs will be incorporated, these being included in separate color channels. Furthermore, each color channel may itself include more than one DMD. Spatial light modulators other than DMDs may also be used, as is known by one skilled in the art.

It should also be clear to those skilled in the art that if a pre-modulator is available with more than a single "pixel" or a global effect, pre-modulation may be selectively applied to parts of the image, using the same principles described above. The principles described remain effective up to and including a pre-modulator implemented using another SLM where there is a one to one correspondence between the pixels of the two SLM devices.

Pre-Modulation On Luminance and Color Components

In the embodiments described above, a single pre-modulator is applied after the light source and before the DMD prisms. Therefore, the analysis focused on luminance component Y, which can be either measured by a chroma meter or be calculated from RGB values of the image data. For image data that is captured by a video camera or processed for video display, the RGB components are nonlinear, and the standardized definition recommended by ITU-R 601 can be used:

$$Y = 0.299R + 0.587G + 0.114B \tag{18}$$

For linear RGB data, the luminance definition recommended by ITU-R 709 should be applied:

$$Y = 0.2125R + 0.7154G + 0.0721B \tag{19}$$

All luminance compensation is done based on the calculated luminance value. The problem with a single pre-modulator is that highlight clipping can result in color shifting, as discussed above.

Figure 5:
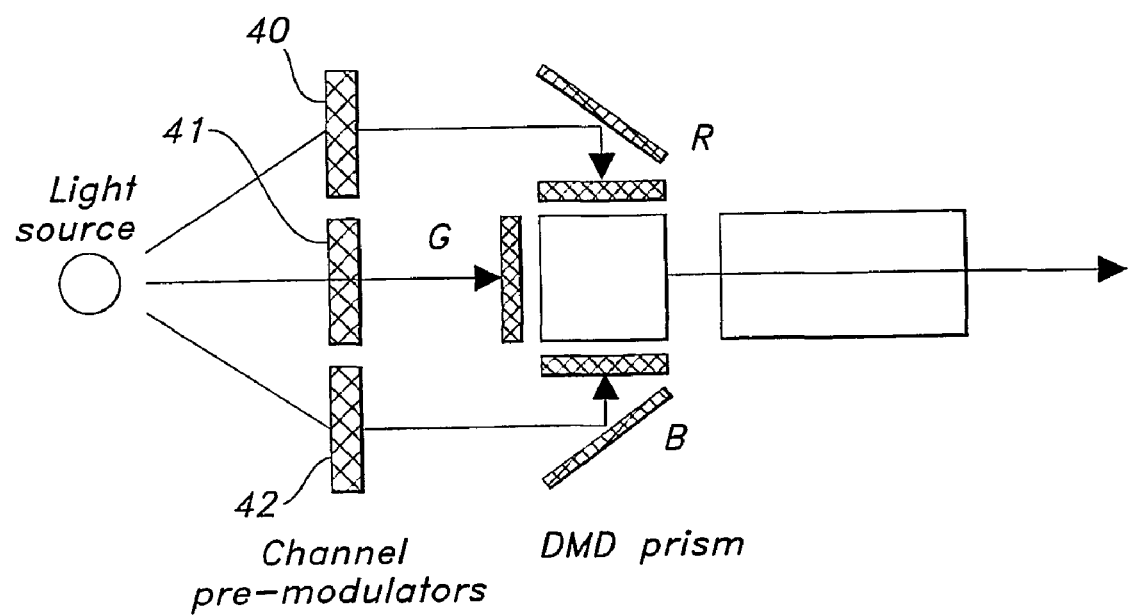
FIG. 5 is a schematized diagram of an embodiment using a pre-modulator for each color channel.

One solution is to have a pre-modulator in each color channel, and the amount of pre-modulation in each channel is controlled by the luminance of each individual color. This embodiment is illustrated in FIG. 5. As shown in FIG. 5, pre-modulator 40 is used for the red channel, pre-modulator 41 is used for the green channel, and pre-modulator 42 is used for the blue channel.

All previous mathematical analysis applies if total luminance is replaced by the luminance of individual color channels. It is possible for the characteristic curves of individual color channels to be different, and this must be taken into consideration. The amount of pre-modulation for individual color channels can be different from the other channels, so that better control of color balance can be achieved. This configuration also allows black level color balance.

Alternative Embodiment

In the previous embodiment, the pre-modulator operates in concert with the SLM, with both active on every frame, with the resulting intensity of each image being the product of the intensity selected by the pre-modulator and the intensity selected by each pixel of the SLM. In an alternative embodiment, the setting of the pre-modulator is established for a number of frames, typically a scene, and changes in pre-modulation setting occur at scene changes.

It is possible to take advantage of the integrating action of the human visual system and perform pre-modulation across two or more frames, relying on the integration of the different intensities in each frame to produce an extended gray scale. This aspect of the invention will now be explained.

Figure 6:
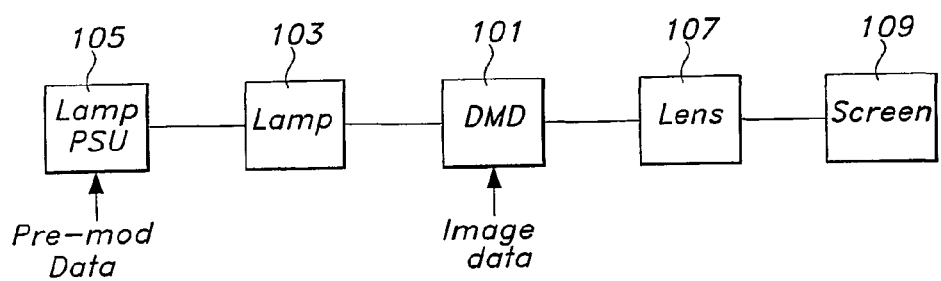
FIG. 6 is a schematic diagram of another embodiment of a display system in accordance with the invention.

Referring first to FIG. 6, this diagram shows schematically a display system including a projector system including a DMD 101, a lamp 103 and a lens 106, the projector system being arranged to project an image onto a cinema screen 109. The DMD 101 is illuminated by the lamp source 103, which is powered by a power supply unit 105. The DMD typically has an array of 1280×1024 mirror elements, the orientation of each of which is controlled by data signals supplied to the DMD. The lamp will typically be a high power Xenon arc lamp. The spatially modulated light produced by the DMD in response to the data signal is focused by the lens 107 onto the cinema screen 109.

The arrangement as described above is a conventional projector system. However, in accordance with the one embodiment, the light which is directed onto the DMD 101 is pre-modulated by modulating the current supply to the arc lamp via power supply unit 105 such that the lamp 103 has an N-bit modulated output.

If the lamp brightness is changed by an amount equivalent to a binary amount N, then it can be shown that the DMD black level is reduced by an amount $2^N$. As will be explained in more detail hereafter, this pre-modulation is applied selectively to groups of frames such as a pair of successive frames K1, K2, by determining whether the image corresponding to a particular frame of the data signal has brightness values corresponding to a bright scene (Mode 1), a dark scene (Mode 2) or an intermediate light level scene (Mode 3).

The mapping of the bits displayed by the mirror elements of the DMD is also modified to correspond to the operating mode.

In the particular embodiment being described, the electronics for the projector has to determine the required pre-modulation mode and set the projector up accordingly.

In its simplest form, if an input MSB is present then Mode 1 is required. If neither the MSB nor the MSB-1 is active, then Mode 2 is required. If the MSB is inactive and the MSB-1 is active, then Mode 3 is required. Then, in Mode 1 as will be explained in more detail hereafter, a bit mapper will route the top M input bits to K1 and K2. Similarly in Mode 2, the bit mapper will route the bottom M bits. In Mode 3, the bit mapper will route the top "α" bits starting from the input MSB-1 to K1 and the bottom (M+N−α) bits including the virtual bit to the bottom bits of K2.

However, the situation could arise in which just one pixel has the MSB set (or the MSB-1 "ON" and the MSB "OFF"). Under these conditions the above detection algorithm would force a Mode 1 (Mode 3) operation because of that one pixel when image scene content would suggest a Mode 3 (Mode 2) as being more optimum.

One option is to count the number of active bits in the MSB and the MSB-1 bit planes. The trigger points for mode selection would then be initiated if the number of active pixels exceeds some threshold. This would be fine but for all those pixels for which the MSB is active. Since this is discarded in Mode 3, then all these pixels would display an erroneous gray scale level. The solution to this is to force these pixels into saturation. This is achieved by setting all the input bits to logical 1 when Mode 3 and the input MSB are both active. A similar arrangement can be applied to the MSB-1 during Mode 2 operation.

This can be extended to take into account the number of adjacent pixels contributing to the sum thereby taking into account the effect of area highlights. In fact the threshold algorithm can be extended to take into account as many scene situations as is deemed necessary when designing the pre-modulator. The sums are stored with each frame of image data as the incoming data is processed. These sum values are then compared with the threshold values when displaying that frame of image data and the pre-modulation mode set up accordingly.

In the following example, in order to simplify the explanation, it is assumed that the image data signal has nine bits after degamma correction and that the DMD is capable of 6 bit resolution (i.e. M=6) rather than the usual 10 bit resolution, and the pre-modulation provides a 2 bit modulation depth (i.e. N=2). These bits are shown as the central sequence of bits in each of FIGS. 7(a), 7(b) and 7(c). The left-hand bit in each bit sequence corresponds to the MSB. The right-hand bit in each bit sequence corresponds to a very low light level corresponding to the LSB/2, that is, a low light level that cannot normally be displayed by the DMD. Accordingly, this bit is shown dotted.

Figure 7A:
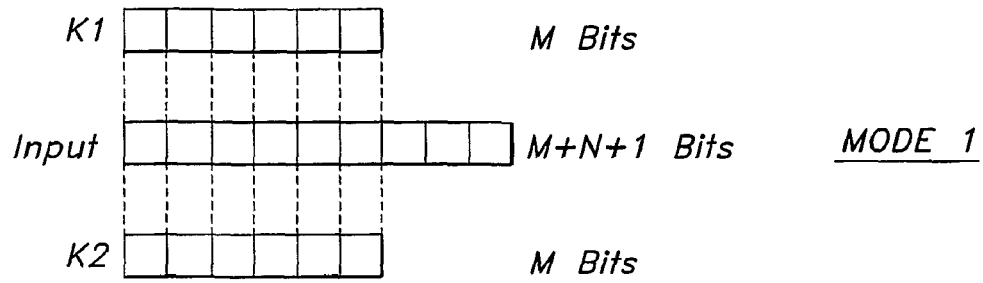
FIG. 7 illustrates the bit mapping of the address signal to the signals used to drive the DMD in FIG. 6.
Figure 7B:
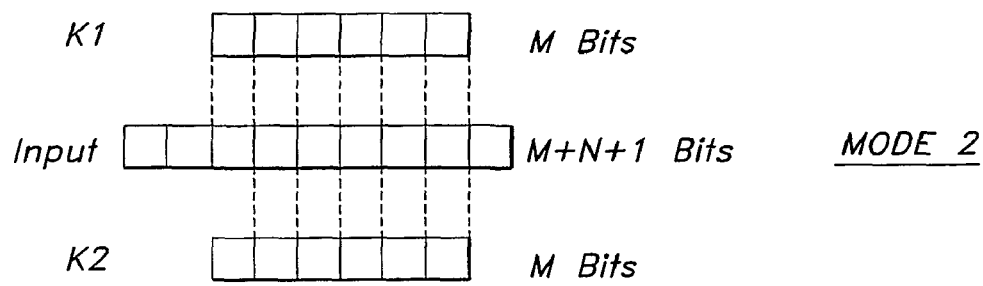

The bit sequences for each frame K1 and K2 in FIGS. 7(a) and 7(b) each have 6 bits (the maximum that can be supported in this particular example) corresponding to M=6, the bit resolution of the DMD 101. In Mode 1 illustrated in FIG. 7(a), the intensity of the light incident on the DMD 101 is not attenuated. In the case of a bright scene, the DMD for both frames K1 and K2 is arranged to display the six uppermost bits, that is, the bits corresponding to the highest light levels. In Mode 2, the lamp current from the power supply unit is reduced so as to attenuate the light output of the lamp by $2^N$ for the lowest light levels. As illustrated in FIG. 7(b), the DMD in both frames K1 and K2 is arranged to display the lowest six displayable bits, but excluding the LSB/2 bit (which the DMD cannot display).

As explained above, even if the image is generally dark, there may exist pixels that should be switched "ON" so as to display the MSB or MSB-I bits, that is the left hand bits. In this case, in Mode 2 it is arranged that if the MSB or MSB-1 should be switched "ON", in displaying these bits the next six lowest bits are all switched "ON". It will be appreciated, however, that this will slightly reduce the brightness for pixels in which the MSB should be switched "ON".

Figure 7C:
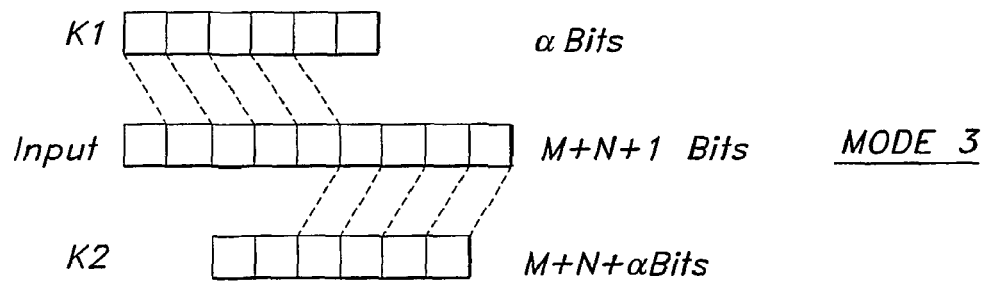

Finally, as illustrated in FIG. 7(c), where it is determined that the image has a generally intermediate luminance value, the lamp is switched between brightness levels on alternate frames with K2 corresponding to the low brightness situation. Thus, the output of the lamp is not attenuated in frame K1, but is attenuated in frame K2. K1 is loaded with the top M bits below the MSB (i.e. ×2 multiplication and the LSB discarded) when the lamp intensity is high and K2 is loaded with the bottom M bits including the LSB/2 bit when the lamp intensity is low.

In the first frame K1 a chosen number of bits (in this particular case, a bits where a is 4) are chosen to be displayed. The value of α is determined so as to give satisfactory results for any particular image signal. For frame K1 the MSB is never displayed, but as in Mode 2 where the MSB for a particular pixel should have been "ON", all the remaining bits are arranged to be "ON" instead. Thus, in K1, the high light levels are displayed.

In the second frame K2, however, the lowest four bit levels are displayed. In this particular case, although the extra bit LSB/2 cannot be normally displayed, by display of a LSB on every other frame (i.e. during K2 only) means that LSB/2 can be displayed. The eye will, of course, be effective to integrate the light level over K1 and K2 to get this extra bit resolution.

Figure 8:
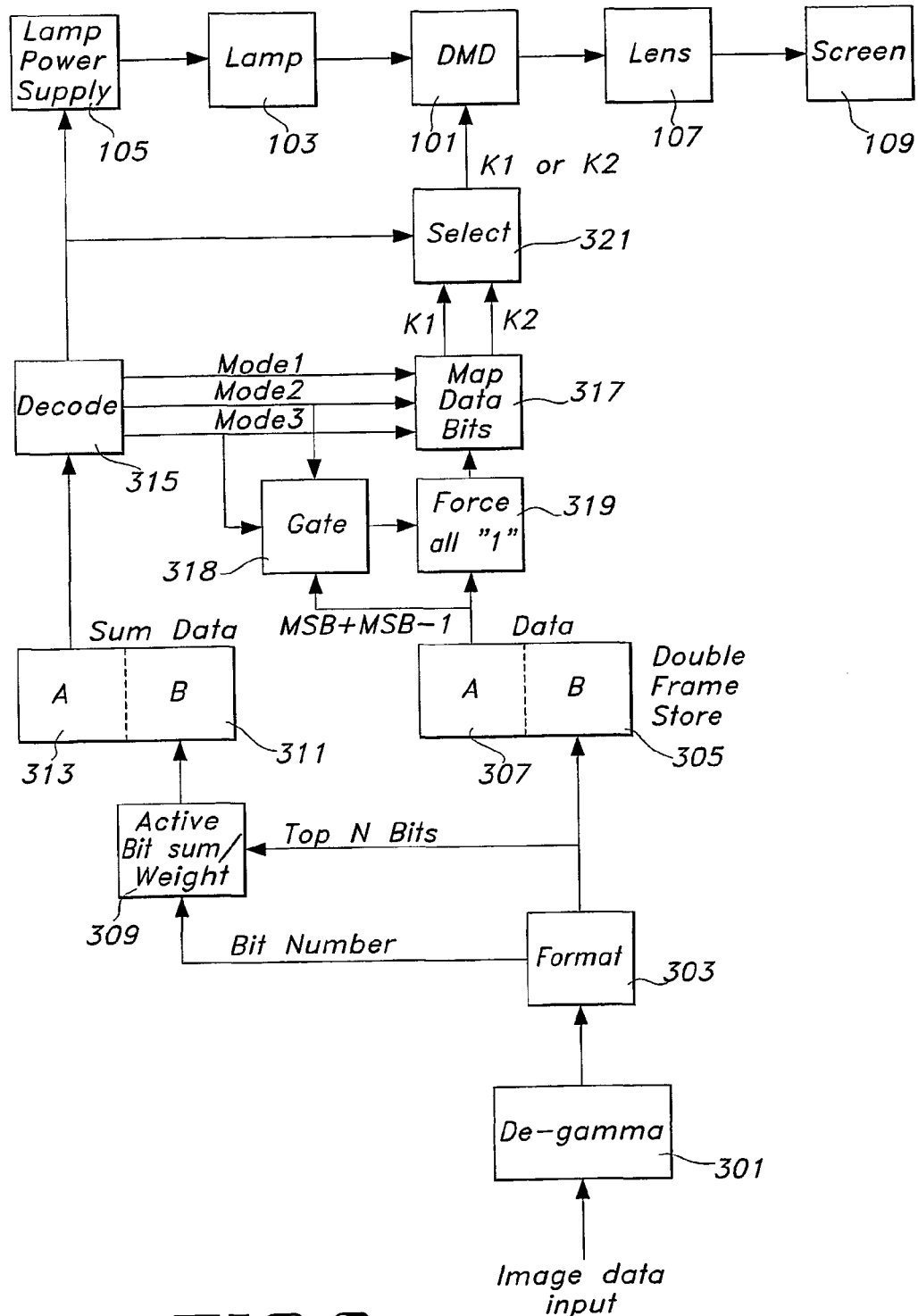
FIG. 8 illustrates circuitry that may be used to implement the pre-modulation indicated in FIG. 6.

Turning now to FIG. 8, this figure illustrates an example of the circuitry for implementing the pre-modulation of the light incident on the DMD 101 as explained in relation to FIGS. 6 and 7. In FIG. 8, equivalent elements to those in FIG. 6 are correspondingly labeled.

The image input signal which, in the particular example to be described is a seven bit digital signal representative of successive frames of a movie film including frame synchronization signals and line signals, is input into a degamma circuit 301. This degamma circuit is effective to remove the gamma modulation on the input signal which has been included to match the form of the image signal for display on a display device, such as a cathode ray tube which has a non-linear transfer characteristic. It will be appreciated that the removal of the gamma modulation is necessary to match the signal to the linear transfer characteristic of the DMD 101. This is explained in U.S. Pat. No. 6,034,660 incorporated herein in its entirety by reference.

Due to the degamma operation, the degamma circuitry is effective to add, in this particular example, two further bits to the input image signal. The nine bit output of the degamma circuitry 301 corresponds to the input signal of M+N+1 bits illustrated in FIG. 7. This is input to a formatter 303 which is effective to produce bit planes of the bits LSB, LSB+1 . . . , MSB-1, MSB of the "ON" times for each pixel of each frame of the image signal as explained in more detail in, for example, U.S. Pat. No. 5,673,060, the contents of which are hereby incorporated by reference. The output of the formatter 303 is applied to a double frame store 305, 307 arranged such that one half of the double frame store can be loaded at the same time as the other half of the double frame store is unloaded. Suitable switching means (not shown) for switching between the two parts of the frame store 305, 307 will be incorporated.

As so far described the address system for the DMD 101 is conventional. However, the projector system also includes circuitry for determining which of the three modes, Mode 1, Mode 2, Mode 3 described above is going to be used to display each pair of frames K1, K2 as will now be described.

Outputs from the formatter 303 are also connected to an active bit sum weight generator 309 which looks at the top N (N=2 in this case) bits to determine how many pixels within a frame the top two bits MSB, MSB-1 are switched "ON" and which pixels these are. The output of the sum generator 309 is applied to a sum data double store 311, 313 which is again arranged such that one store is being written while the other data store is being read out, suitable switching means again not being shown in the figure.

The output of the relevant data store 311 or 313 is applied to a decoder 315 which is effective to compare the number of pixels in which the MSB or MSB-1 is switched "ON" with a threshold value to determine whether the frame is a relatively high luminance frame (Mode 1), low luminance frame (Mode 2) or an intermediate frame (Mode 3). An output of the decoder 315 is arranged to provide appropriate control signals to the lamp power supply 105 to cause the current to the lamp 103 to vary such that the lamp either provides an unattenuated (Mode 1 and frame K1 in Mode 3) or attenuated (Mode 2 and frame K2 in Mode 3) output. Appropriate signals are also applied by the decoder 315 to a unit 316 effective to map the data bits from the frame store 305 or 307 and apply the values to a selector 321 which is effective to select either the bit values for K1 or the bit values for K2. It will be appreciated that, in the case of Modes 1 and 2, the values for the flames K1 and K2 will be identical. However, in the case of Mode 3, the bit patterns illustrated in FIG. 7(c) are used in which the top four bits are applied in frame K1, while the lowest four bits including the LSB/2 bit is applied in frame K2. These values are used to address the DMD to switch selected pixels "ON" within each bit plane.

In order to avoid errors in image brightness caused by the MSB or MSB-1 light not being displayed in bright areas of the image when Modes 2 or 3 are selected, the projector system includes a gate 319 which, when such pixels are identified, enables circuit 319 to cause all the MSB-2 to LSB input bits in Mode 2 or all the MSB-1 to LSB/2 input bits in Mode 3 set to the active state for the identified pixels.

It will be appreciated from the above that each frame is effectively displayed twice with the same values being displayed in the cases of Modes 1 and 2 and different values in Mode 3, the human eye being effective to integrate the light from the two different light levels over the successive frames to form an average value. The incoming image signal will often have been derived from a 24 frames per second input, this being doubled to display 48 frames per second, each frame being repeated twice. However, in some circumstances it may be possible to apply the same principles to different frames.

Figure 9:
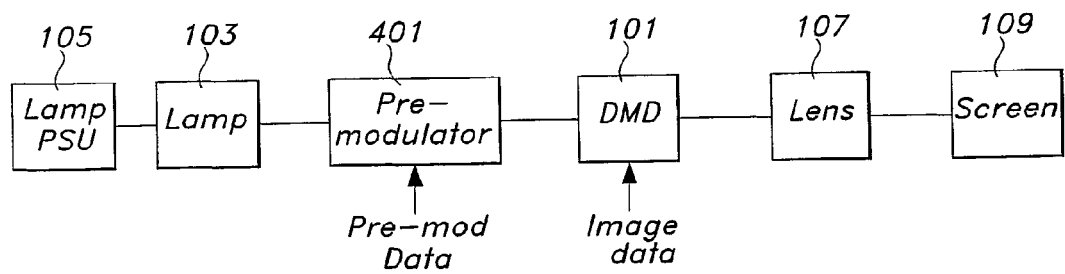
FIG. 9 is a schematic diagram of another embodiment of a display system in accordance with the invention.

Turning now to FIG. 9, pre-modulation of the light intensity of the light incident on the DMD can also be achieved by including a pre-modulator 401 between the lamp 103 and the DMD 101. In this case the control signals shown in FIG. 8 ES being supplied to the lamp power supply 105 are supplied instead to the pre-modulator 401.

The pre-modulator may take the form of a mechanical device for effecting the transmission of the light from the lamp or, alternatively, may be an electrical device.

Figure 11:
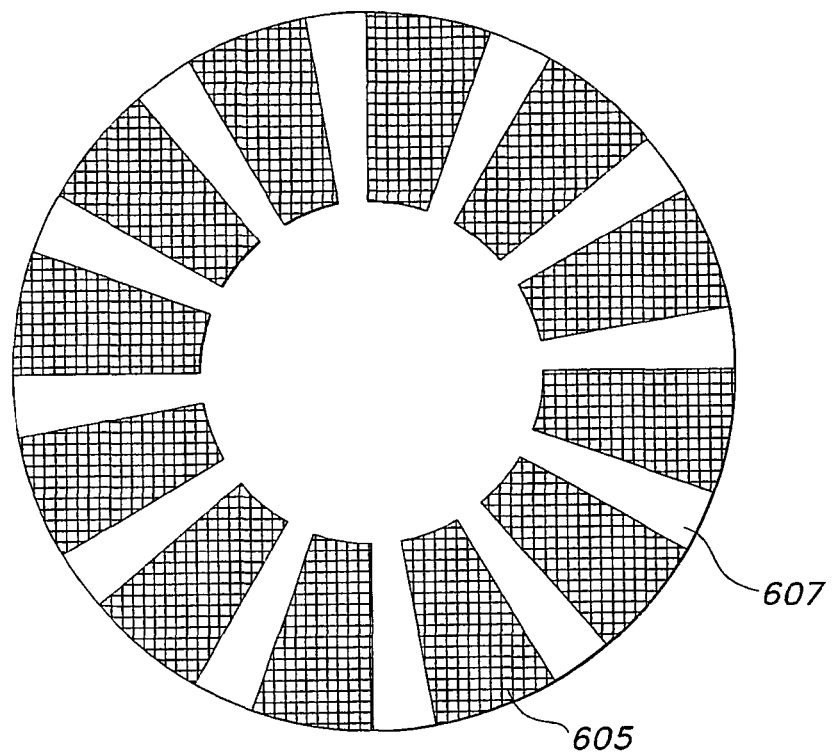
FIGS. 10 and 11 are, respectively, a side view and a plan view of a modulator for use in the system of FIG. 9.
Figure 10:
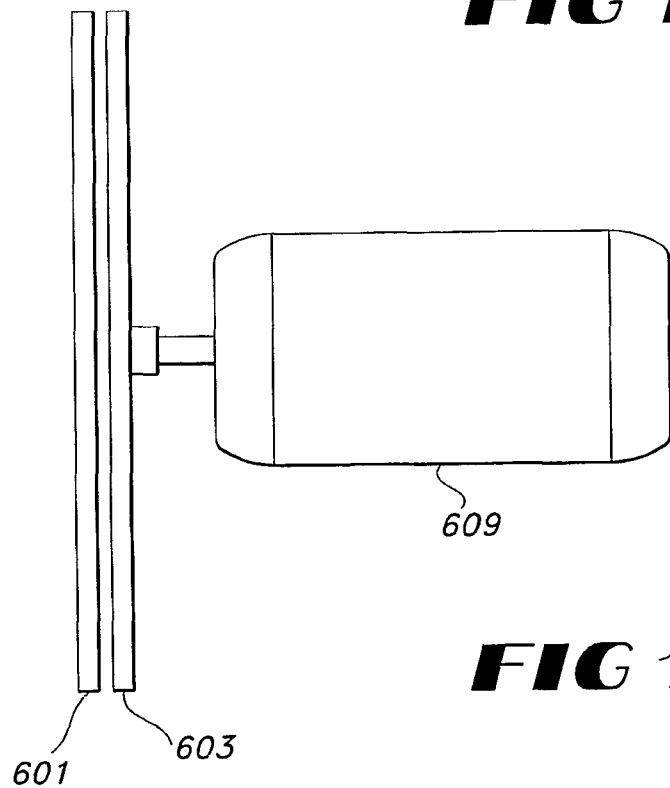

Referring now to FIGS. 10 to 14, an example of a mechanical pre-modulator 401 takes the form of two circular plates 601, 603. Each plate is formed with a series of trapezoidal mirrored spokes 605 as shown in FIG. 11, the remaining portions 607 of the plates being transparent. The plates 601, 603 are arranged in a stack as indicated in FIG. 10 with the front plate 601 remaining static and the back plate 603 being rotated by a stepper motor 609 under the control of a motor control unit 610.

Figure 12:
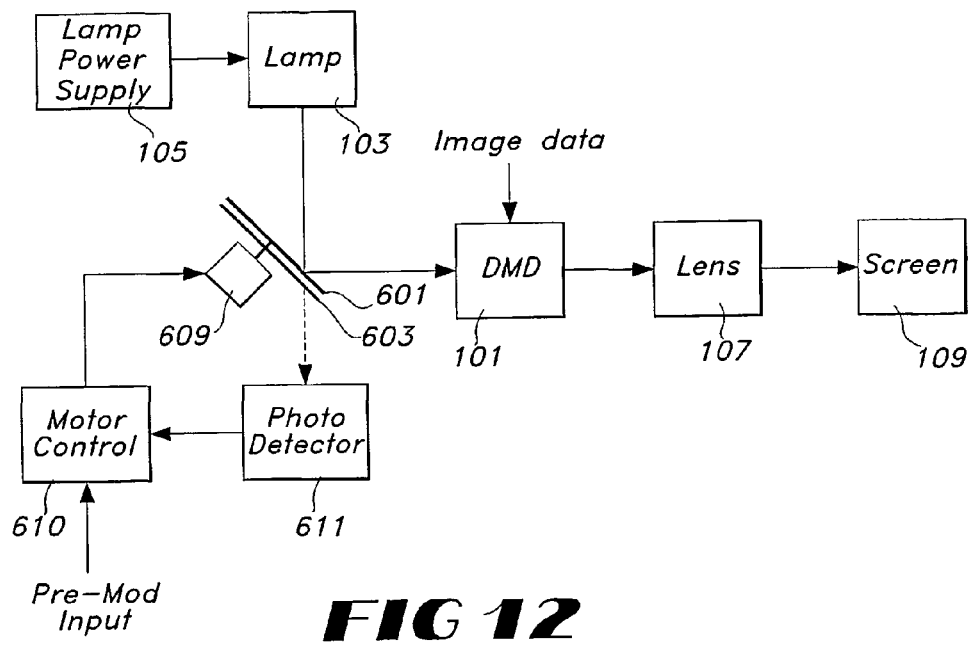
FIG. 12 is a schematic illustration of the modulator of FIGS. 10 and 11 incorporated in the system of FIG. 9.
Figure 13:
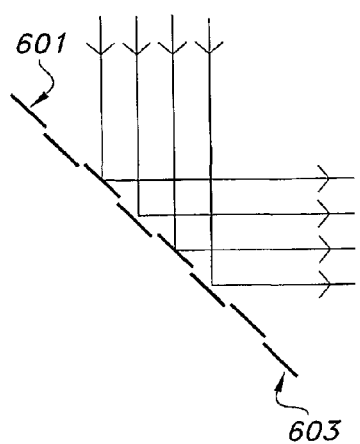
FIGS. 13 and 14 illustrate differing alignment of the reflective portions of the modulator of FIGS. 10 and 11.
Figure 14:
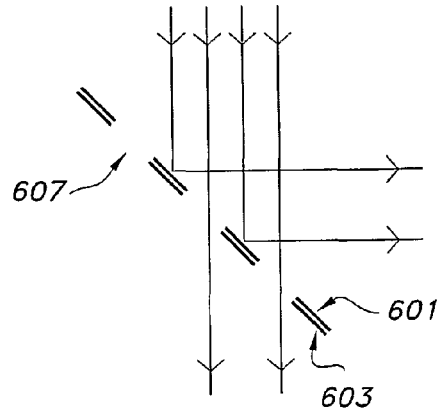

Referring now particularly to FIG. 12, this figure illustrates the pre-modulator inserted in the light path between the lamp 103 and the DMD 101. The rotation of the stepper motor 609 is controlled by the pre-modulation data supplied to the motor control unit 610 such that in the configuration shown in FIG. 13, the mirrored portions 607 on each of the disks 601, 603 are aligned, this resulting in 50% attenuation of the light from the lamp 103 as light which is not intercepted by the mirrored fingers 605 will pass straight through to be detected by photodetector 611. At the extreme as illustrated in FIG. 14 where the mirror portions 605 are totally out of alignment, light which is not intercepted by the front set of mirrored portions will be intercepted by the mirror portions on the rear plate 603, thus giving minimum attenuation of the light. It will be appreciated that intermediate positions will give varying amounts of attenuation. The output of the photodetector is supplied to the motor control unit 610 to synchronize the stepper motor to produce the required attenuation.

It will be appreciated that it is quite common in a DMD projection system for the light from the lamp to undergo a 90° rotation by a mirror angled at 45°, this may include a cold mirror for infra-red radiation removal. Accordingly, a cold mirror can be incorporated in this rotating shutter approach in order to simultaneously remove unwanted infrared wavelengths from the light emitted from the lamp 103.

Figure 15:
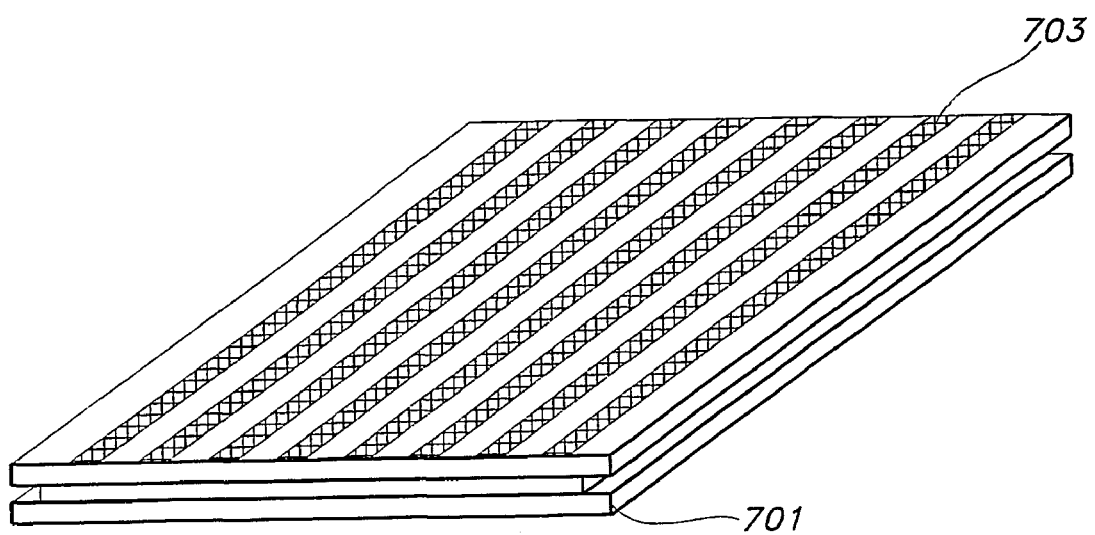
FIG. 15 illustrates an alternative modulator for use in the system of FIG. 9.

As an alternative, the twin disc mechanical pre-modulator of FIG. 12 could be replaced by an electronic version comprising an LCD reflective shutter 701 with silvered stripes 703 on the active face as illustrated in FIG. 15. Such an arrangement will avoid the necessity of mechanically aligned parts and enable a wider range of attenuation levels to be achieved.

Figure 16:
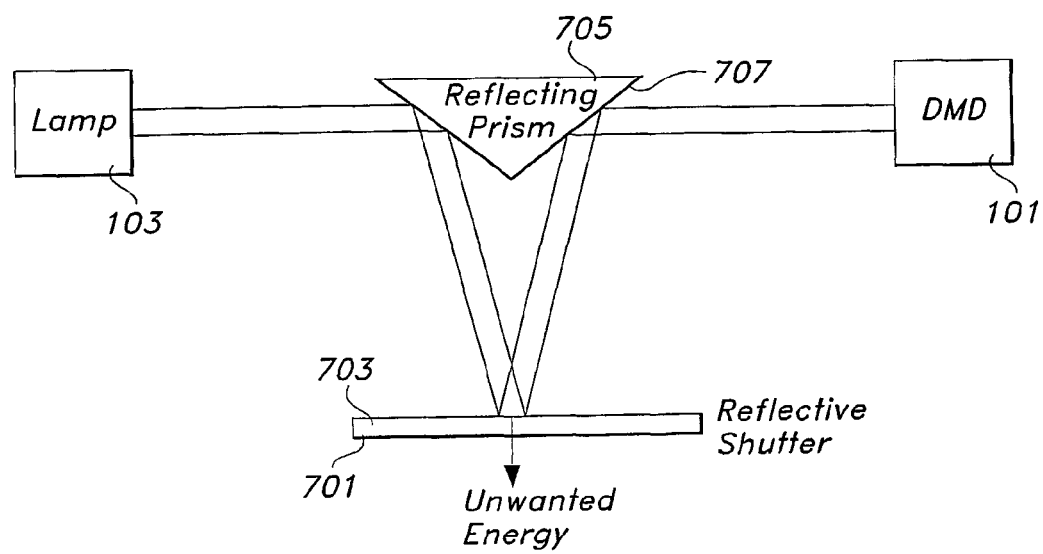
FIG. 16 illustrates an alternative optical arrangement for use with the modulator of FIGS. 10 and 11, or FIG. 15.

FIG. 16 shows an alternative optical arrangement including a mirrored prism 705 interposed in the light path between the lamp 103 and the DMD 101. The modulator is as shown in FIG. 15, i.e. a liquid crystal panel 701, typically a ferroelectric liquid crystal, with a silvered grating 703 overlying the liquid crystal. In use of the pre-modulator, the face of the prism 706 opposing the lamp 103 directs the incident light onto the liquid crystal panel 701. Where the liquid crystal panel 701 is electrically switched so as to be reflective, maximum light reflectance from the liquid crystal and the overlying grating 703 will occur with the light beam then being reflected from the surface 707 of the prism 705 towards the DMD 101. In analogous manner to the mechanical pre-modulator where the liquid crystal panel 701 is switched so as to be non-reflective, the light will be attenuated to an extent determined by the widths of the reflective portions of the grating 703. It will be appreciated that the prism of FIG. 16 may also be used with a mechanical modular as in FIGS. 10 and 11.

It will be appreciated that the use of the prism 705 enables the input and output light for the pre-modulator to be on the same axis.

Figure 17:
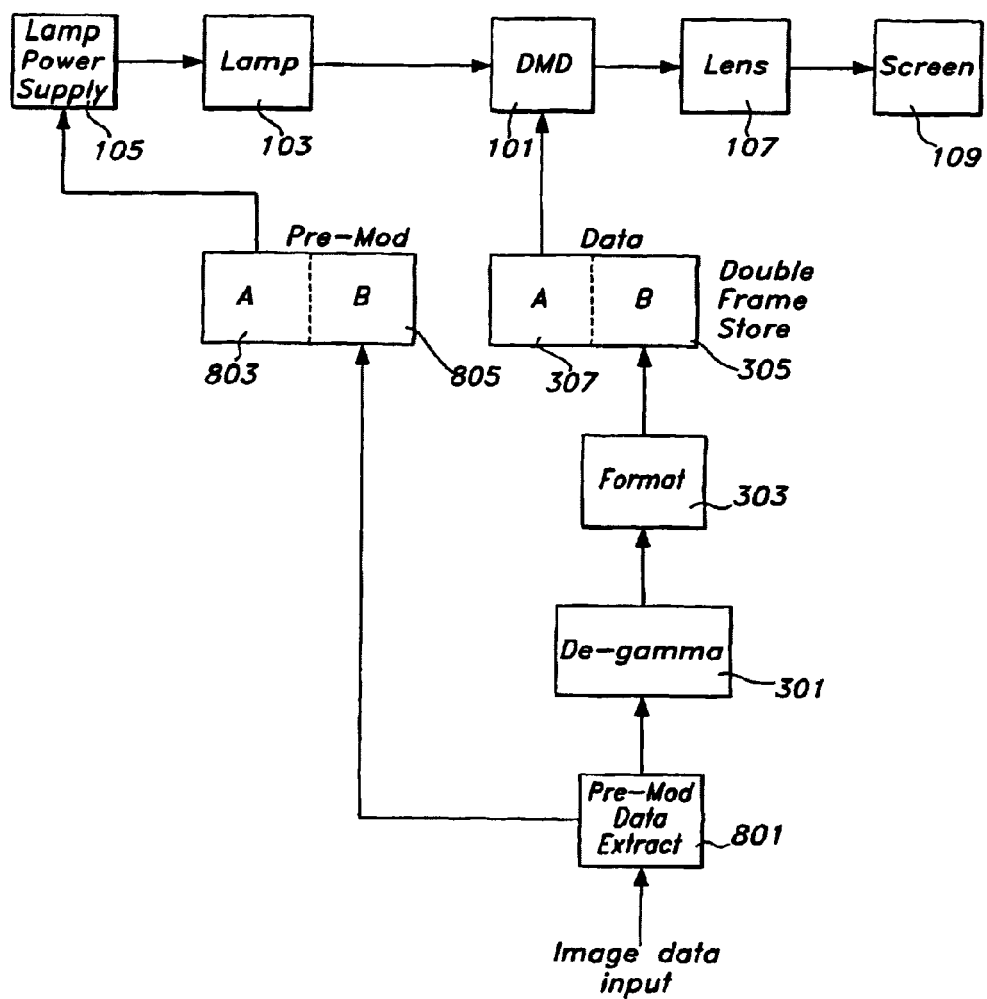
FIG. 17 illustrates a further embodiment in which identification of the pre-modulation to be performed on each frame is encoded in the input signal.

In the above embodiment, the decision as to whether each pair of frames should be Mode 1, Mode 2 or Mode 3 is made automatically in the projector. However, it is possible for the input image signal to be encoded with instructions as to which mode each pair of frames should be. This coding would typically be performed by the colorist on inspection of the color values or the luminance of the frames. In these circumstances, the circuitry shown in FIG. 8 may be simplified as shown in FIG. 17. The decoder 315, data bit mapper 317, gate 318, "Force all ON" circuitry 319, and frame K1 or K2 selector 321 are omitted, and a pre-modulator data extract block 801 added in the input signal path. This block 801 is effective to remove the instruction code, and provide appropriate signals to a pre-modulator double data store, which is effective to store the appropriate pre-modulation instructions for controlling the lamp power supply 105. The bit data input into the double data stores 305, 307 will be pre-encoded with the relevant modified bit sequences.

It will be appreciated that, while the circuitry for adjusting the lamp power supply is modified in FIG. 17, the circuitry for pre-modulating the light 401 can similarly be modified.

It will be appreciated that in order to simplify the explanation of the above alternate embodiments are described with respect to a single color channel, the embodiments being equally relevant to projection systems including one or more DMDs in each of three parallel color channels for red, blue and green light split off from the lamp 103, the image signal including R, G, B signals or alternately luminance and chrominance data. Each color channel will normally undergo the same pre-modulation, the criteria for which of the three modes is used being determined from the R, G, B values or the luminance values. Thus, for example, where one color channel R, G, B includes high levels of MSBs, the same mode will be selected in all three color channels. The invention is also applicable to a serial color system using, for example, a color wheel to sequentially project red, green and blue light onto one or more DMDs.

It will be appreciated that the invention is applicable to systems in which the input image data signal is a video signal or a signal other than a video signal, which has been produced specifically for use with a spatial light modulator.

It will also be appreciated that the invention is applicable to spatial light modulators other than DMDs, for example, liquid crystal devices, in particular, ferroelectric liquid crystal devices having fast switching times.

While the embodiments have been explained on the basis of gray scale produced by a pulse-width-modulation technique, with bit planes for the MSB down to LSB being produced in the bit frame stores, the invention is also applicable to modified bit sequences, for example including low light level spatial dithering, as described in U.S. Pat. No. 6,064,366, fractional bits as described in U.S. Pat. No. 5,686,939, bit splitting to improve the temporal balance in each frame as described in U.S. Pat. No. 5,986,640, and bit stuffing as described in U.S. Pat. No. 6,057,816 (corresponding to EP 0755556), the contents of each of these patents being incorporated herein in their entirety by reference.

It will be appreciated that, while in the alternate embodiments the frames are grouped into pairs of frames, the invention is applicable to projection systems in which the groups comprises three or more frames.

It will also be appreciated that, while the light intensity is modulated to two different intensities (i.e. N=2), it is possible to increase the resolution further by modulating the light to three or more different intensities.

Because the foregoing is provided for purposes of illustrating, explaining, and describing embodiments of the present invention, further modifications and adaptations to these embodiments will be apparent to those skilled in the art and may be made without departing from the scope or spirit of the invention. Yet additionally, ferroelectric devices, liquid-crystal displays (LCD), or other light sources or valves or filters may be employed as necessary or desired.

The invention claimed is:

1. A method of decreasing the dark level of a frame, the method comprising:
   receiving pixel code values for the frame;
   determining the brightness of the frame;
   determining a pre-modulation factor based on the brightness of the frame, wherein the pre-modulation factor is used to vary, between at least two different intensities, the intensity of light incident on a spatial light modulator of a projection system; and
modifying pixel code values for the frame so that the brightness of each pixel remains substantially unchanged while the dark level of the frame is reduced.

2. The method of claim 1, further comprising:
receiving a data stream containing the pre-modulation factor and modified pixel code values by a projection system having a spatial light modulator.

3. The method of claim 1, wherein the pre-modulation factor is selected by the projection system and the pixel code values are modified by the projection system.

4. The method of claim 1, wherein the pre-modulation factor is determined by a thresholding of pixel code values in the frame.

5. The method of claim 1, wherein the pre-modulation factor is determined by averaging the pixel code values in the frame.

6. The method of claim 1, wherein the pre-modulation factor is chosen to cover an entire luminance range in the frame.

7. The method of claim 1, wherein the pre-modulation factor is used to control the output of a light source.

8. The method of claim 1, wherein the pre-modulation factor is used to control a second spatial light modulator.

9. The method of claim 1, wherein the pixel code values are modified by multiplying each pixel code value by a compensation factor.

10. The method of claim 1, wherein pixel code values are modified by a variable amount depending on both the pixel code value and the amount of light incident on the spatial light modulator.

11. A method of decreasing the dark level of a flame, the method comprising:
receiving pixel code values for the frame;
determining the brightness of the frame;
determining a pre-modulation factor based on the brightness of the frame,
wherein the pre-modulation factor is used to vary, between at least two different intensities, the intensity of light incident on a spatial light modulator of a projection system; and
partially modifying pixel code values for each frame so that the brightness of each pixel remains substantially unchanged while the dark level and highlight clipping of the frame is reduced.

12. The method of claim 11, wherein the pixel code values are partially modified so that they make a gradual transition into clipping.

13. The method of claim 11, wherein the pixel code values are partially modified by multiplying each pixel code value by a compensation factor so that a maximum brightness for each pixel is not exceeded.

14. A projection system including:
a spatial light modulator comprising an array of switchable elements, each switchable element being switchable to an "ON" state in which light incident on the array is directed to a projection lens in response to data signals in the form of bits representing successive frames of an image data signal, the spatial light modulator producing gray scale images representative of each frame by pulse-width-modulation of the "ON" times;
means for varying between two or more different intensities, the intensity of light incident on the spatial light modulator in successive groups of frames dependent on the brightness values of each group of frames; and
means for adjusting the bits to be displayed in each group of frames dependent on the intensity of light incident on the spatial light modulator.

15. A projection system according to claim 14, in which said means for modulating comprises means for adjusting the power supplied to a light source effective to illuminate the spatial light modulator.

16. A projection system according to claim 14, in which the means for modulating comprises a variable attenuation device in the light path to the spatial light modulator.

17. A projection system according to claim 16, hi which the means for modulating comprises two reflective areas, and means for varying the reflectance of one of the areas.

18. A projection system according to claim 16, in which the two reflective areas are mutually movable, and the means for varying is effective to move the areas relative to each other such that said one area is masked by the other area so as to reduce the overall reflectance.

19. A projection system according to claim 17, in which the reflective area with the switchable reflectance is a liquid crystal panel.

20. A projection system according to claim 14, in which the spatial light modulator is a DMD.

21. A projection system according to claim 14, in which the spatial light modulator is a LCD.

22. A projection system according to claim 14 in which each group comprises two frames.

23. A projection system according to claim 22, in which the means for modulating is arranged to modulate between two different light intensities, the intensity of adjacent pairs of frames either being attenuated, not attenuated or one frame attenuated and the other frame not attenuated.

24. A projection system according to claim 14, in which the projector system includes means for determining the light modulation dependent on the number of pixels in each frame which have more or less than a threshold brightness.

25. A projection system according to claim 14, in which the image data signal includes codes for determining the light modulation for each frame, and the projector system includes means responsive to said code to control the light modulation.

26. A projection system according to claim 14, further comprising a light source effective to illuminate the spatial light modulator.

27. A method of increasing the dynamic range of a projection system including a spatial light modulator comprising an array of switchable elements, the method comprising:
varying, between at least two different intensities, the intensity of light incident oil the spatial light modulator in successive groups of frames dependent on the brightness values of each group of frames;
adjusting signals in the form of bits to be displayed in each group of frames dependent on the intensity of light incident on the spatial light modulator; and
switching an element of the spatial light modulator to an "ON" state in response to data signals such that light produced from a light source is directed to a projection lens.

28. A projection system including:
a spatial light modulator comprising an array of switchable elements, each switchable element being switchable to an "ON" state in which light incident on the array is directed to a projection lens in response to data signals in the form of bits representing successive frames of an image data signal, the spatial light modulator producing gray scale images representative of each frame by pulse-width-modulation of the "ON" times;

means for varying between two or more different intensities, the intensity of light incident on the spatial light modulator in adjacent groups of frames, wherein the group of frames consists of at least two frames, dependent on the brightness values of each group of frames; and means for adjusting the bits to be displayed in each group of frames dependent on the intensity of light incident on the spatial light modulator.

* * * * *